United States Patent
Inaba

(10) Patent No.: US 6,763,021 B1
(45) Date of Patent: Jul. 13, 2004

(54) MONITORING SWITCHING METHOD AND APPARATUS FOR REDUNDANT PART OF TRANSMISSION APPARATUS

(75) Inventor: Akira Inaba, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,240

(22) Filed: Mar. 22, 2000

(30) Foreign Application Priority Data

Mar. 30, 1999 (JP) .......................................... 11-088480

(51) Int. Cl.[7] .............................................. H04L 12/50
(52) U.S. Cl. ........................ 370/360; 370/370; 370/244
(58) Field of Search .................... 370/360, 241, 370/242, 243, 244, 245, 246, 247, 216, 217, 218, 219, 220, 351, 361, 362, 363, 373, 376, 386; 371/20.1, 20.4

(56) References Cited

U.S. PATENT DOCUMENTS 5,408,462 A * 4/1995 Opoczynski ................ 370/220
5,570,345 A * 10/1996 Kaprielian .................. 370/228
5,963,545 A * 10/1999 Shibasaki ................... 370/242
6,005,841 A * 12/1999 Kicklighter ................. 370/217
6,038,210 A * 3/2000 Kim .......................... 370/216
6,169,726 B1 * 1/2001 Dempsey .................... 370/219
6,363,050 B1 * 3/2002 Ebisawa ..................... 370/216

FOREIGN PATENT DOCUMENTS

| JP | 6-29960 | 2/1994 |
| JP | 6-89198 | 3/1994 |
| JP | 9-51318 | 2/1997 |
| JP | 9-160804 | 6/1997 |

* cited by examiner

Primary Examiner—Kenneth Vanderpuye
Assistant Examiner—Ricardo M. Pizarro
(74) Attorney, Agent, or Firm—Katten Muchin Zavis Rosenman

(57) ABSTRACT

Different signal patterns are inserted in different time slots within a vacant slot for signals passing through redundantly configured units. A selector, which selects one of the units as a working unit, is controlled to select the inserted signal patterns in sequence. A pattern monitoring circuit is provided on the output side of the selector, and identifies a faulty unit by detecting an abnormality in a signal pattern.

4 Claims, 12 Drawing Sheets

MONITORING SWITCHING METHOD AND APPARATUS FOR REDUNDANT PART OF TRANSMISSION APPARATUS

BACKGROUND OF THE INVENTION

1. Field of the Invention

The present invention relates to a monitoring switching method and apparatus for an apparatus that is redundantly configured in part and, more particularly, to a method and apparatus for fault monitoring and switching control for a redundant part of a transmission apparatus used in digital communications.

2. Description of the Related Art

FIG. 1 shows an example of fault monitoring and switching control for a duplexed part of a transmission apparatus some of whose constituent units are arranged in a duplexed configuration.

In FIG. 1, reference numerals 1-1 and 1-2 are duplexed information transmitting units having pattern insertion circuits 1-4 and 1-5, respectively, for performing path monitoring within the apparatus. The block indicated at 1-3 is also an information transmitting unit, which comprises a circuit 1-6 for monitoring a pattern from the unit 1-1, a circuit 1-7 for monitoring a pattern from the unit 1-2, and a selector (SEL) circuit 1-8 for selecting one of the units 1-1 and 1-2. Reference numeral 1-9 is a monitoring control section for providing signal restoration by controlling the SEL circuit 1-8 in the event of a fault based on the pattern monitoring outputs of the circuits 1-6 and 1-7. That is, when a fault is detected by the circuit 1-6, the SEL circuit 1-8 is controlled to switch the channel from the unit 1-1 to the unit 1-2, and when a fault is detected by the circuit 1-7, switching is made from the unit 1-2 to the unit 1-1.

FIG. 2 is a diagram for explaining a fault evaluation method for identifying a faulty unit based on a detected fault, and a switching method for switching the duplexed units, in a configuration where the transmission apparatus is implemented by combining multiples of the configuration shown in FIG. 1.

In FIG. 2, similarly to the first described configuration, reference numerals 2-1 to 2-5 are information transmitting units, 2-6 to 2-9 are pattern insertion circuits, 2-10 to 2-15 are pattern monitoring circuits, 2-16 to 2-18 are SEL circuits each for selecting one of its upstream units, and 2-19 is a monitoring control section for monitoring patterns and controlling the SEL circuits.

As an example, when a fault is detected by the pattern monitoring circuit 2-10, the fault evaluation and switching control has been accomplished in one of the following two ways.

(i) Assuming that the unit 2-1 has failed, the SEL circuit 2-16 in the unit 2-3 is controlled to switch out the unit 2-1. (The most suspect unit is determined to be the faulty unit).

(ii) Assuming that the units 2-1 and 2-3 have both failed, the SEL circuits 2-16 and 2-17 in the units 2-3 and 2-4 are controlled to switch out the unit 2-1, and further, the SEL circuit 2-18 in the unit 2-5 is controlled to switch out the unit 2-3. (All suspect units are determined to be faulty).

In the method of FIG. 1, since the pattern monitoring circuits 1-6 and 1-7 can fail themselves, such failures must be distinguished in order to accurately identify the faulty unit. This necessarily increases the complexity of the fault detection mechanism of the pattern monitoring circuits.

Furthermore, since the pattern monitoring circuits 1-6 and 1-7 are placed in front of the SEL circuit 1-8, there is an unmonitored section including the SEL circuit 1-8 itself. To solve this problem, a pattern monitoring circuit must be added after the SEL circuit 1-8, which further increases the complexity.

On the other hand, the methods of FIG. 2 involve the following problems.

With the method (i), when the unit 2-1 is not faulty but the unit 2-3 is faulty, the transmission line cannot be restored.

With the method (ii), since the units 2-1 and 2-3 are both determined to be faulty, unnecessary switching occurs when only the unit 2-3 is faulty.

SUMMARY OF THE INVENTION

It is accordingly an object of the present invention to provide a monitoring switching method and apparatus that can, with simple circuitry, accurately identify and switch out a faulty unit.

According to the present invention, there is provided a monitoring switching method for a redundant part of a transmission apparatus, comprising the steps of: in a plurality of redundantly configured units, inserting respectively different signal patterns in respectively different time slots for signals passing through the respective units; controlling a selector to select all of the inserted signal patterns in sequence, the selector being configured to accept outputs from the plurality of redundantly configured units and to select from among the outputs one main signal for output; monitoring the signal patterns at an output side of the selector; and controlling the selector based on the result of the monitoring.

According to the present invention, there is also provided a monitoring switching method further comprising the steps of: in a plurality of second redundantly configured units each having the selector, inserting respectively different second signal patterns in respectively different time slots for signals passing therethrough; controlling a second selector to select all of the inserted second signal patterns in sequence, the second selector being configured to accept outputs from the plurality of second redundantly configured units and to select from among the outputs one main signal for output; monitoring the second signal patterns at an output side of the second selector; and controlling the selector and the second selector based on the results of the monitoring of the signal patterns and the second signal patterns.

According to the present invention, there is provided a monitoring switching apparatus for a redundant part of a transmission apparatus, comprising: a plurality of pattern inserting sections, respectively provided in a plurality of redundantly configured units, for inserting respectively different signal patterns in respectively different time slots for signals passing through the respective units; a selector for accepting outputs from the plurality of redundantly configured units, and for selecting from among the outputs one main signal for output and also selecting all of the inserted signal patterns in sequence; a pattern monitoring section, provided on an output side of the selector, for monitoring the signal patterns inserted by the pattern inserting sections; and a monitoring control section for controlling the selector based on the result of the monitoring performed by the pattern monitoring section.

According to the present invention, there is also provided a monitoring switching apparatus further comprising: a plurality of second pattern inserting sections, respectively provided in a plurality of second redundantly configured units each having the selector, for inserting respectively different second signal patterns in respectively different time slots for signals passed through the pattern monitoring section; a second selector for accepting outputs from the plurality of second redundantly configured units, and for selecting from among the outputs one main signal for output and also selecting all of the inserted second signal patterns in sequence; and a second pattern monitoring section, provided on an output side of the second selector, for monitoring the second signal patterns inserted by the second pattern inserting sections, and wherein the monitoring control section controls the selector and the second selector based on the results of the monitoring performed by the pattern monitoring section and the second pattern monitoring section.

DESCRIPTION OF THE PREFERRED EMBODIMENTS

Figure 1:
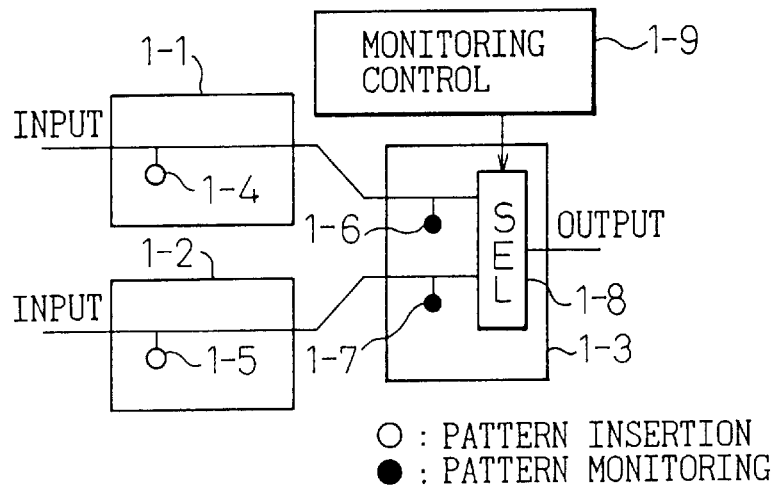
FIG. 1 is a diagram for explaining a monitoring switching method for an apparatus having a redundant configuration.
Figure 2:
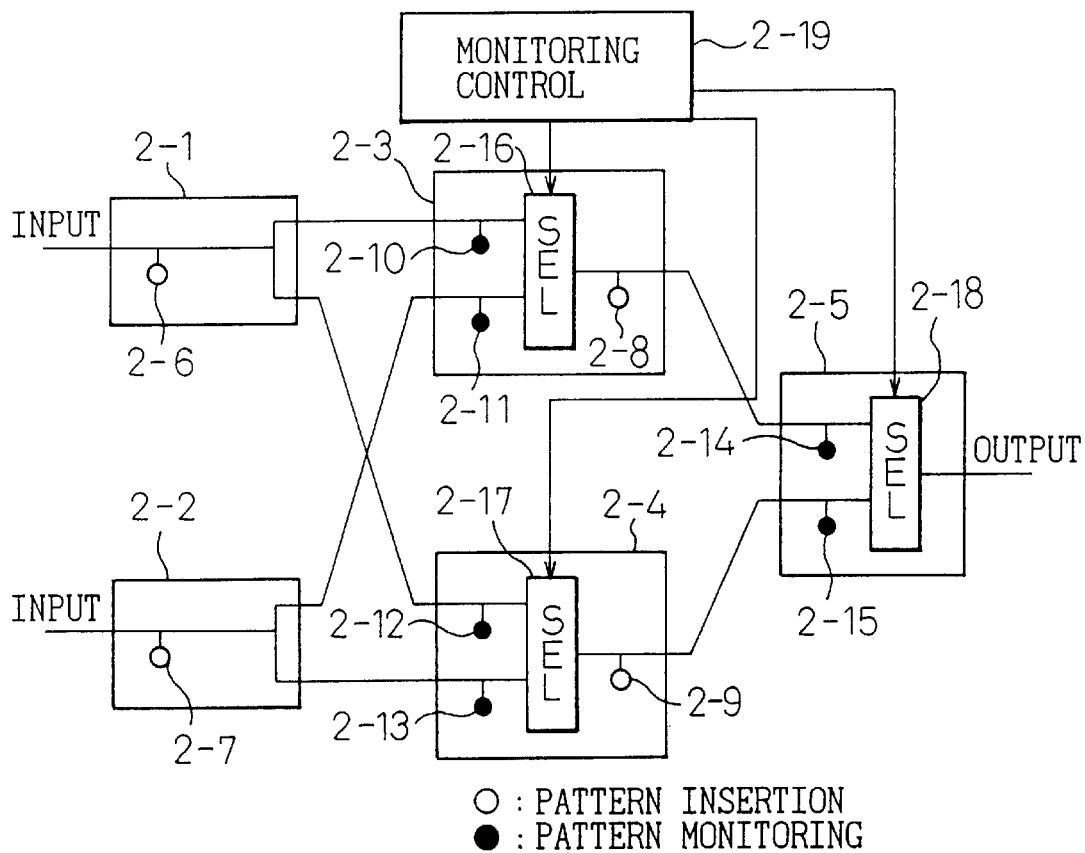
FIG. 2 is a block diagram showing an apparatus constructed by combining multiples of the configuration shown in FIG. 1.
Figure 3:
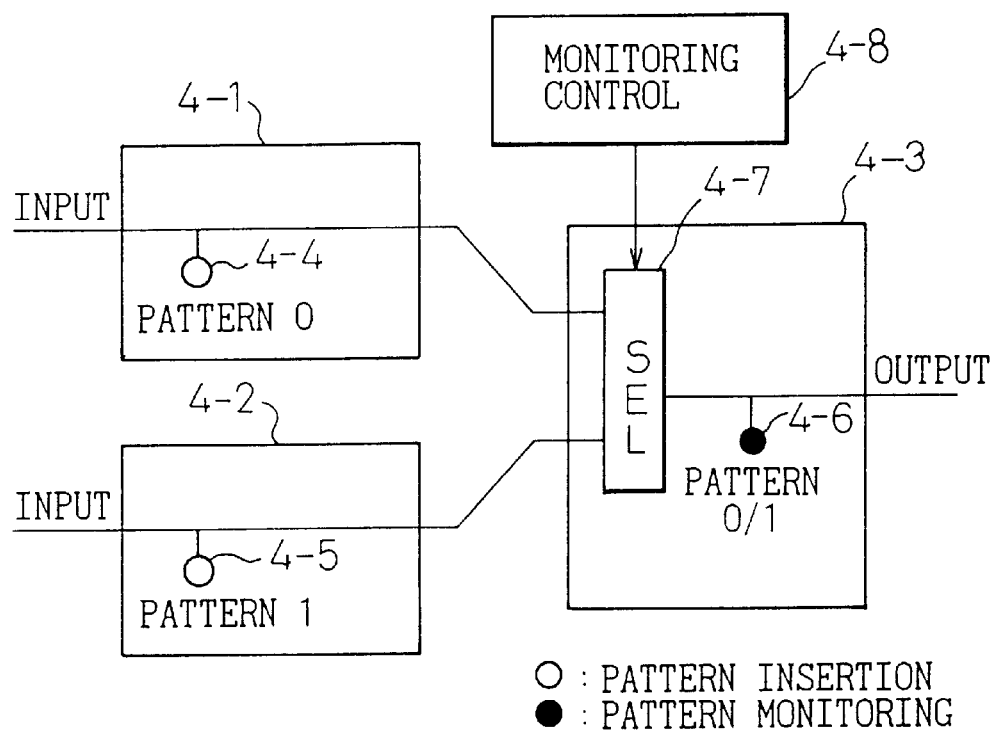
FIG. 3 is a diagram for explaining a monitoring switching method for an apparatus having a redundant configuration according to the present invention.
Figure 4:
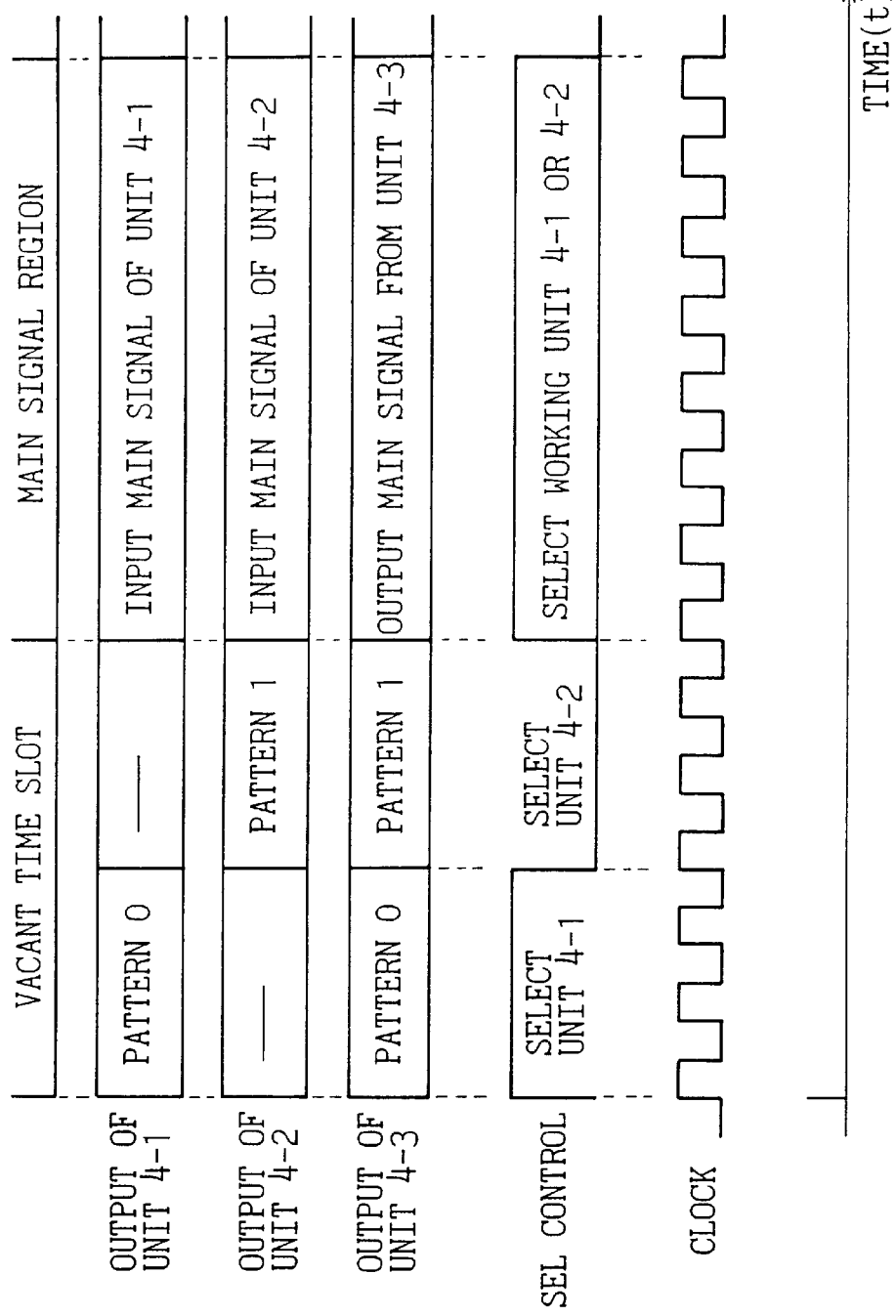
FIG. 4 is a timing chart for explaining the present invention.

FIG. 3 is a diagram for explaining monitoring within an apparatus according to one embodiment of the present invention, and FIG. 4 is a time chart for the same.

In FIG. 3, pattern insertion circuits 4-4 and 4-5 provided in information transmitting units 4-1 and 4-2, respectively, insert respectively different signal patterns 0 and 1 in respectively different time slots within a vacant time slot in which a main signal is not carried.

As shown in FIG. 4, a SEL circuit 4-7 performs switching in synchronization with the pattern insertion circuits, allowing the patterns 0 and 1 as well as a main signal on the working channel to pass through it. Following the SEL circuit 4-7 is provided only one pattern monitoring circuit 4-6, which monitors the patterns 0 and 1 contained in output signals of the SEL circuit 4-7.

Figure 5:
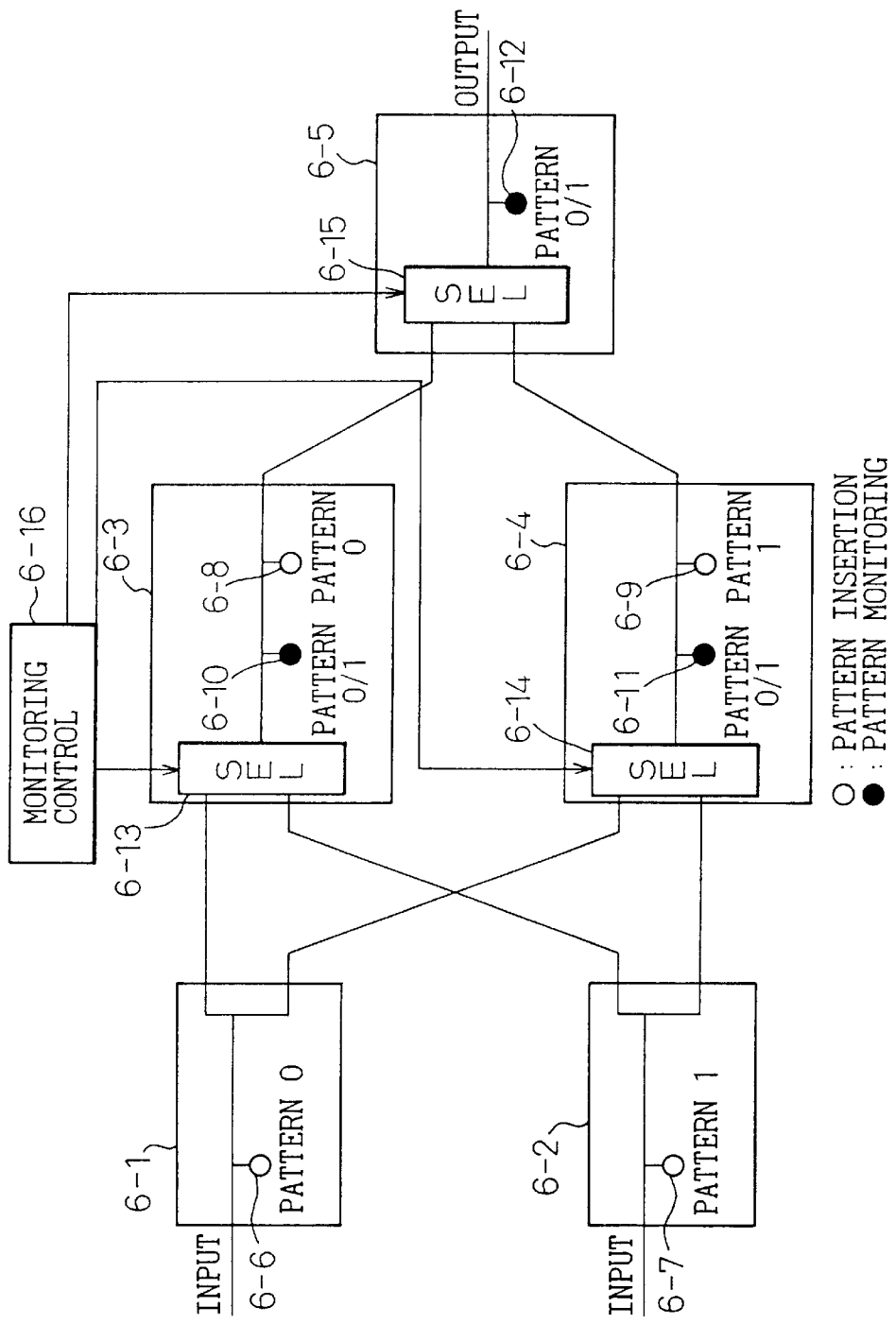
FIG. 5 is a block diagram showing an apparatus constructed by combining multiples of the configuration shown in FIG. 3.

FIG. 5 shows an example in which multiples of the configuration shown in FIG. 3 are combined.

The following two methods are possible for fault evaluation and switching control in the event of a fault. Which method is to be employed is determined by such factors as the circuit characteristics, the allowable time for fault recovery, and the operation and maintenance procedures performed after fault recovery.

Figure 6:
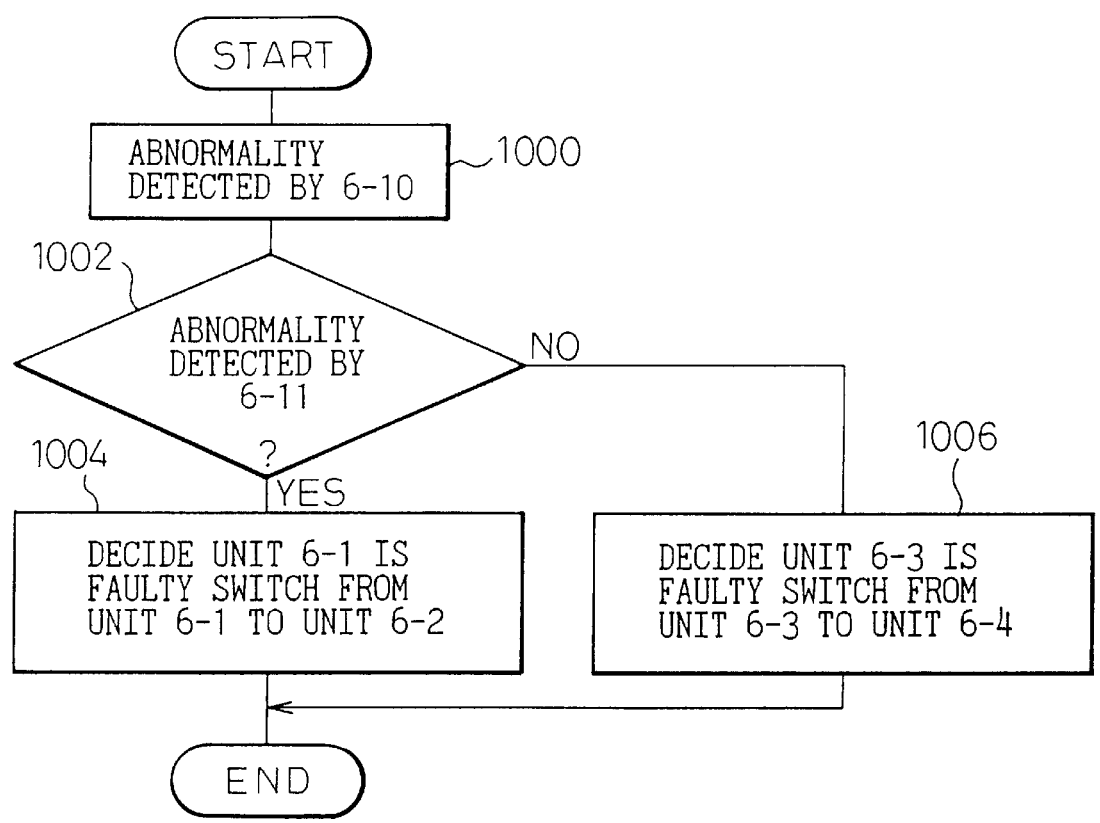
FIG. 6 is a flowchart for explaining fault evaluation and switching by majority evaluation according to the present invention.

(i) Fault evaluation and switching by majority evaluation (FIG. 6)

When abnormality of a pattern from a unit 6-1 is detected by both pattern monitoring circuits 6-10 and 6-11 (steps 1000 and 1002 in FIG. 6), it is decided that the unit 6-1 is faulty, and SEL circuits 6-13 and 6-14 contained in units 6-3 and 6-4 are controlled to switch out the unit 6-1 (step 1004). When abnormality of a pattern from the unit 6-1 is detected only by the pattern monitoring circuit 6-10, it is decided that the unit 6-3 is faulty, and a SEL circuit 6-15 in a unit 6-5 is controlled to switch out the unit 6-3 (step 1006).

(Majority Evaluation)

Figure 7:
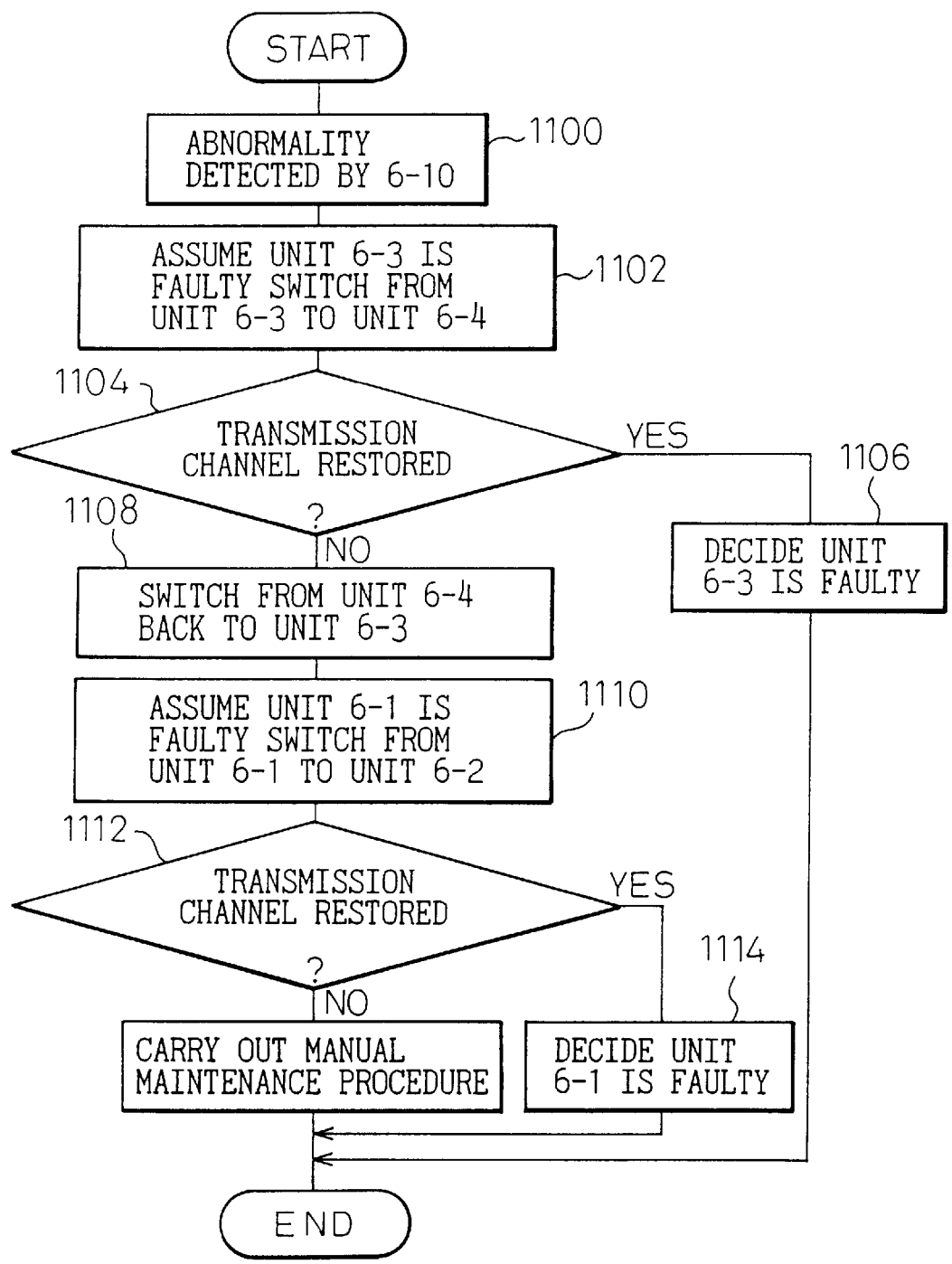
FIG. 7 is a flowchart for explaining automatic evaluation involving sequential switching according to the present invention.

(ii) Automatic evaluation involving sequential switching (FIG. 7)

When abnormality of a pattern from the unit 6-1 is detected by the pattern monitoring circuit 6-10 (step 1100 in FIG. 7), evaluation is performed in the following sequence to identify a faulty unit.

First, by assuming that the most suspect unit 6-3 is faulty, the SEL circuit 6-15 in the unit 6-5 is controlled to switch out the unit 6-3 (step 1102). If the transmission channel continuity is restored with this switch-out operation (step 1104), it is then decided that the unit 6-3 is faulty (step 1106).

If the above procedure failed to restore the channel, the SEL circuit 6-15 in the unit 6-5 is controlled to switch in the unit 6-3 (step 1108), and by assuming that the next most suspect unit 6-1 is faulty, the SEL circuits 6-13 and 6-14 in the units 6-3 and 6-4 are controlled to switch out the unit 6-1 (step 1110). If the transmission channel continuity is restored with this switch-out operation (step 1112), it is decided that the unit 6-1 is faulty (step 1114).

This not only achieves a reduction in circuitry by reducing the number of monitoring circuits to one, but also contributes to simplifying the fault detecting mechanism of the pattern monitoring circuit and the maintenance work performed at the time of fault detection.

Furthermore, by placing the pattern monitoring circuit following the SEL circuit and by performing constant monitoring by switching the SEL circuit as necessary, the unmonitored section can be reduced and apparatus reliability enhanced.

Figure 8:
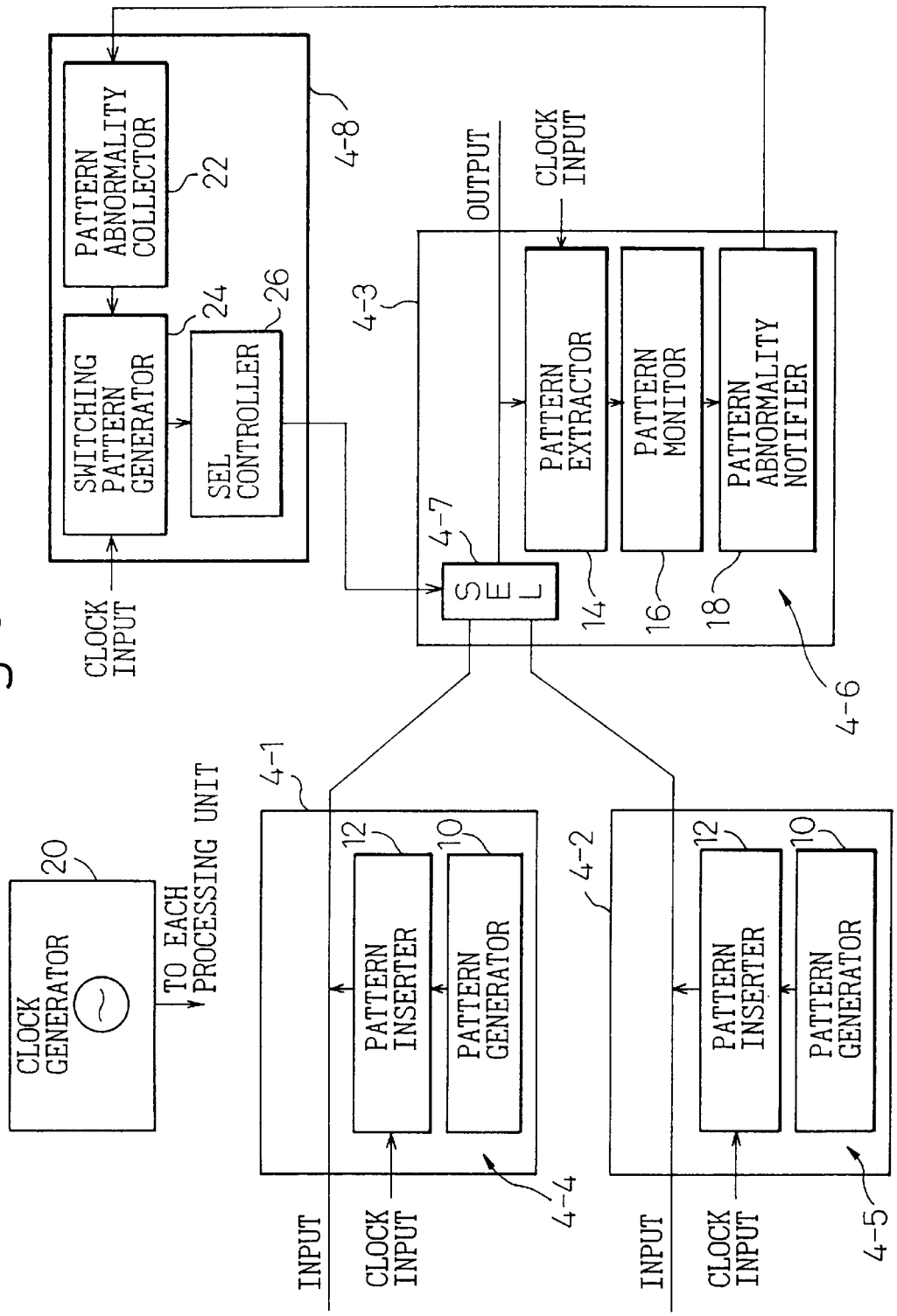
FIG. 8 is a block diagram showing the detailed configuration of the system of FIG. 3.

FIG. 8 shows the details of each of the constituent elements of the system shown in FIG. 3. The same constituent elements as those in FIG. 3 are designated by the same reference numerals.

The pattern insertion circuits 4-4 and 4-5 each include a pattern generator 10 and a pattern inserter 12. The pattern generator 10 in the unit 4-1 generates a pattern 0, while the pattern generator 10 in the unit 4-2 generates a pattern 1. The pattern inserter 12 inserts the signal passed from the pattern generator 10 into an assigned slot within a vacant time slot by timing its operation with an input clock, as shown in FIG. 4.

The pattern monitoring circuit 4-6 includes a pattern extractor 14, a pattern monitor 16, and a pattern abnormality notifier 18. The pattern extractor 14 extracts the pattern 0/1 information by timing its operation with the input clock. The pattern monitor 16 checks the pattern 0/1 information extracted by the pattern extractor 14 and, if an abnormality is detected, passes abnormality information to the pattern abnormality notifier 18. The pattern abnormality notifier 18 notifies the monitoring control section 4-8 of the pattern abnormality detected by the pattern monitor 16.

Reference numeral 20 is a clock generating unit which generates a base clock used to perform pattern insertion and monitoring, selector switching control, etc. and distributes the clock to the various parts.

In the example shown in FIG. 8, the monitoring control section 4-8 is constructed with hardware only. The monitoring control section 4-8 in FIG. 8 includes a pattern abnormality collector 22, a switching pattern generator 24, and a SEL controller 26.

The pattern abnormality collector 22 collects the pattern abnormality information from the pattern abnormality notifier 18 and passes it to the switching pattern generator 24. The switching pattern generator 24 generates a SEL switching pattern, such as shown in FIG. 4, synchronized to the input clock. That is, in the first half time slot within the vacant time slot, the output of the unit 4-1 is selected, allowing the pattern 0 to pass through, and in the second half time slot, the output of the unit 4-2 is selected, allowing the pattern 1 to pass through. In the main signal region, the unit 4-1 or 4-2, whichever is set as the working unit, is selected. When an abnormality state is reported from the pattern abnormality notifier 18, working/standby switching control is performed, as described below.

(1) Both pattern 0 and pattern 1 are normal: Current working channel is retained.
(2) Pattern 0 is normal but pattern 1 is abnormal: Channel 0 (unit 4-1) is set for working.
(3) Pattern 0 is abnormal but pattern- 1 is normal: Channel 1 (unit 4-2) is set for working.
(4) Both pattern 0 and patter 1 are abnormal: Current working channel is retained.

The SEL controller 26 controls the SEL 4-7 based on the switching pattern generated by the switching pattern generator 24.

Figure 9:
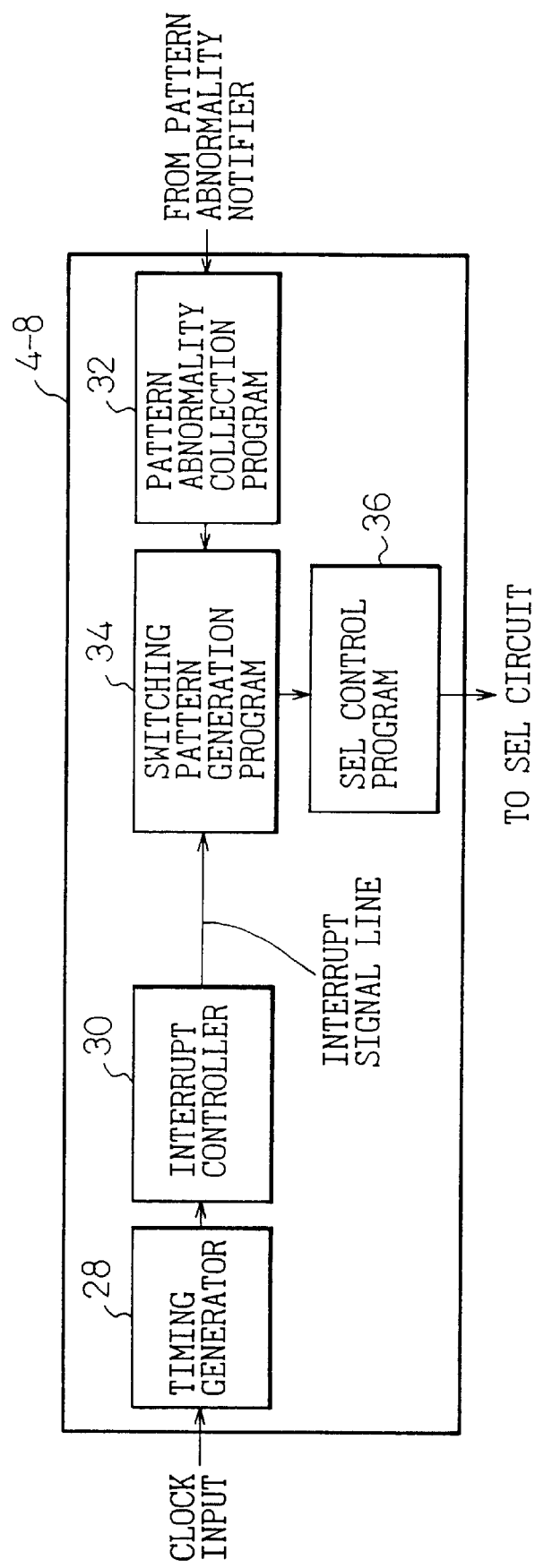
FIG. 9 is a block diagram showing another example of the detailed configuration of a monitoring control section 4-8.

FIG. 9 shows an example in which the monitoring control section 4-8 is implemented in hardware and software. The monitoring control section 4-8 of FIG. 9 includes a timing generator 28 and interrupt controller 30 as hardware, and a pattern abnormality collection program 32, switching pattern generation program 34, and SEL control program 36 as software. The programs 32, 34, and 36 run in parallel under operating system (OS) control.

The timing generator 28 generates, based on the input clock, the timing necessary for controlling the SEL. The interrupt controller 30 determines interrupt timing based on the information from the timing generator 28, and activates the switching pattern generation program 34 through an interrupt signal line. The pattern abnormality collection program 32 collects the pattern abnormality information from the pattern abnormality notifier 18 (FIG. 8) and passes it to the switching pattern generation program 34. The switching pattern generation program 34 generates a switching pattern similar to that generated by the switching pattern generator 24 in FIG. 8, and activates the SEL control program 36. The SEL control program 36 controls the SEL 4-7 based on the switching pattern generated by the switching pattern generation program 34.

The system shown in FIGS. 8 and 9 is capable of detecting faults, including a fault occurring in the SEL circuit, as will be described below. (Methods for identifying a faulty unit by fault evaluation after the detection of a fault and for controlling the switching are the same as those described before.)

(i) When the unit 4-1 has failed
    Abnormality of the pattern 0 is detected by the pattern monitor 16 in the unit 4-3.
(ii) When the SEL 4-7 in the unit 4-3 has failed
    Since SEL switching does not occur, the SEL output does not switch between the pattern 0 and pattern 1, and the pattern monitor 16 in the unit 4-3 detects a succession of patterns 0 or patterns 1. The failure of the SEL 4-7 in the unit 4-3 can thus be detected.

Figure 10:
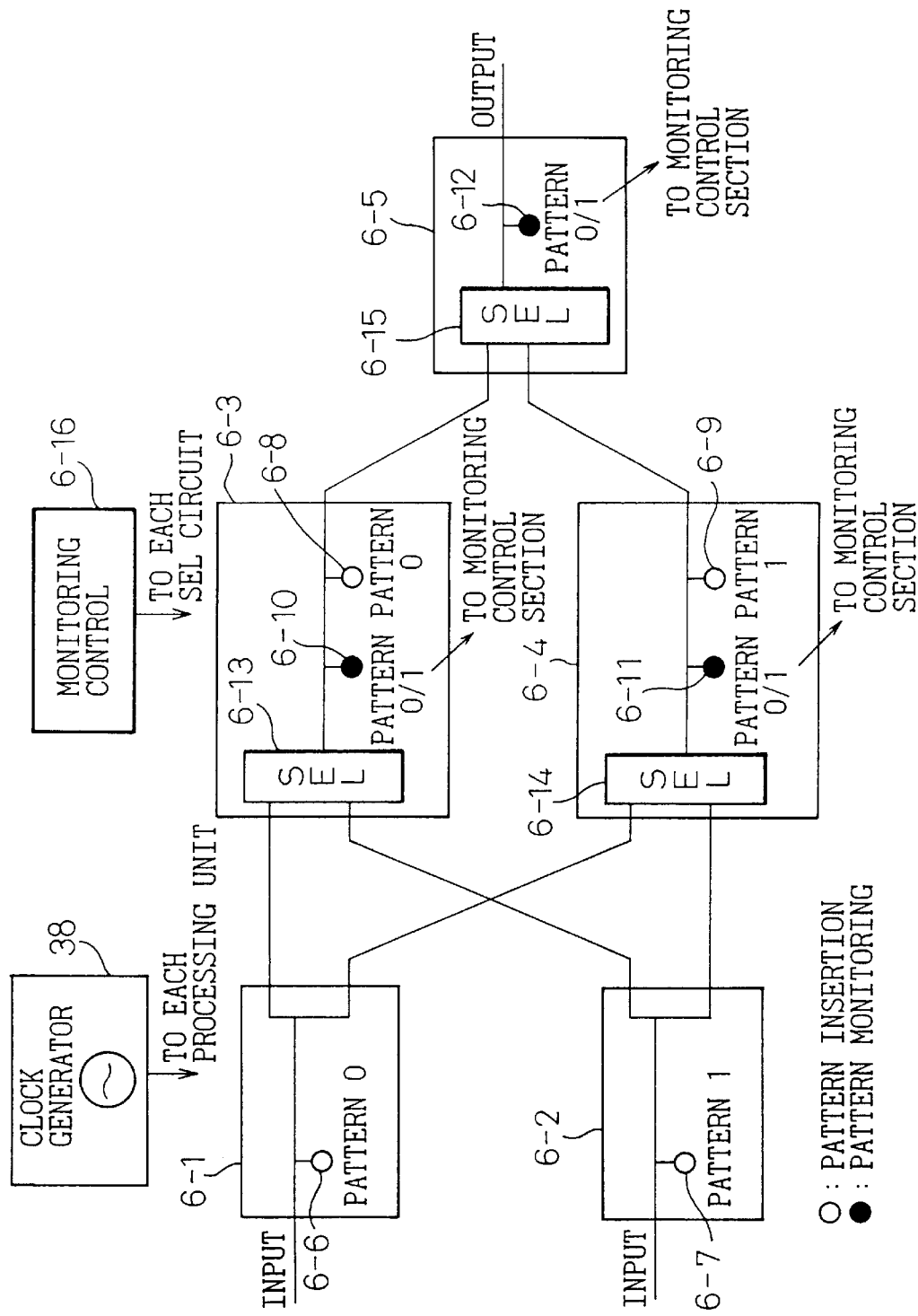
FIG. 10 is a block diagram showing the detailed configuration of the system of FIG. 5 that performs the majority evaluation.

FIG. 10 shows the details of the system described with reference to FIG. 5 and that performs the majority evaluation illustrated in FIG. 6. The pattern insertion circuits 6-6, 6-7, 6-8, and 6-9, like the pattern insertion circuits 4-4 and 4-5 in FIG. 8, each include the pattern generator 10 and pattern inserter 12, though not shown here. The pattern monitoring circuits 6-10, 6-11, and 6-12, like the pattern monitoring circuit 4-6 in FIG. 8, each include the pattern extractor 14, pattern monitor 16, and pattern abnormality notifier 18, though not shown here. A clock generator 38 generates a base clock used to perform pattern insertion and monitoring, selector switching control, etc. and distributes the clock to the various parts.

Figure 11:
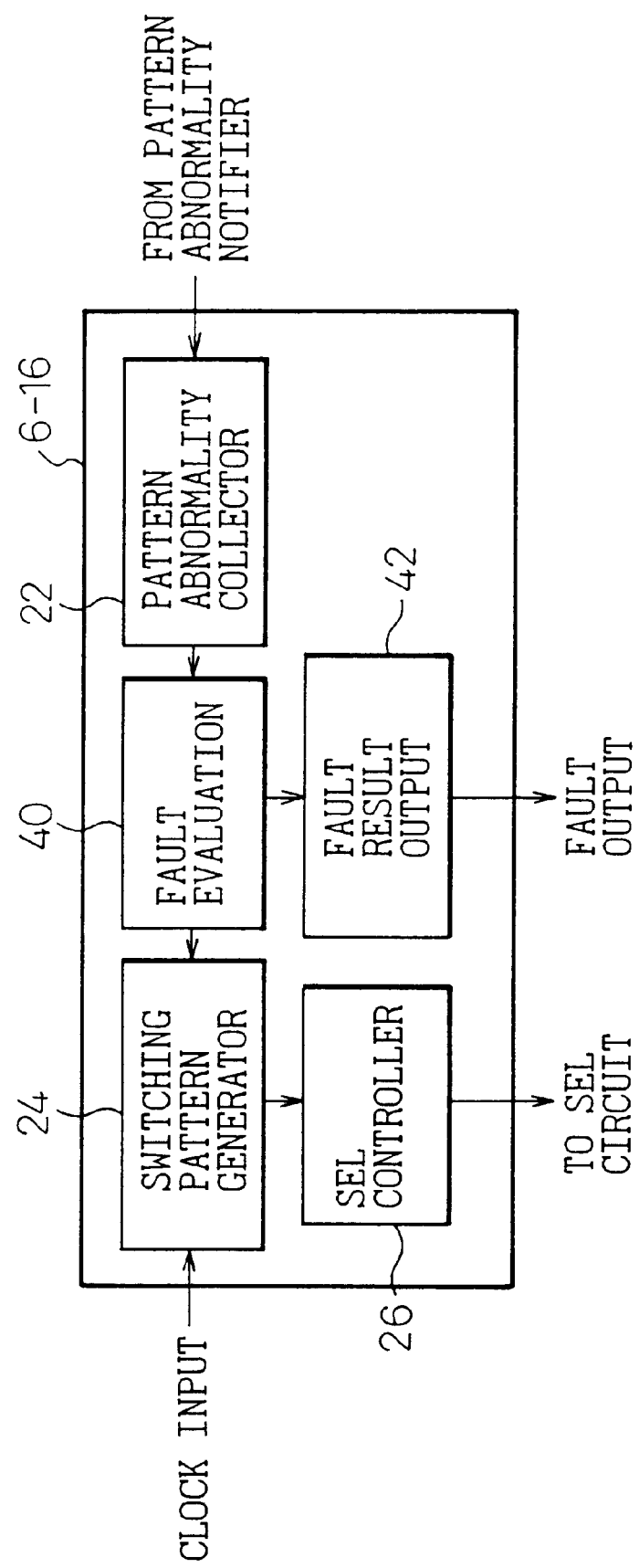
FIG. 11 is a block diagram showing the detailed configuration of a monitoring control section 6-16 in FIG. 10.

A monitoring control section 6-16, as shown in detail in FIG. 11, differs from the monitoring control section 4-8 of FIG. 8 by the inclusion of a fault evaluation section 40 and a fault result output section 42. The fault evaluation section 40 identifies a faulty unit by performing majority evaluation based on the pattern abnormality collected by the pattern abnormality collector 22, and issues a unit switching instruction to the switching pattern generator 24, while passing the information of the faulty unit to the fault result output section 42. Based on the information of the faulty unit passed from the fault evaluation section 40, the fault result output section 42 alerts maintenance personal by lighting a FAIL lamp on the unit or by other means.

Figure 12:
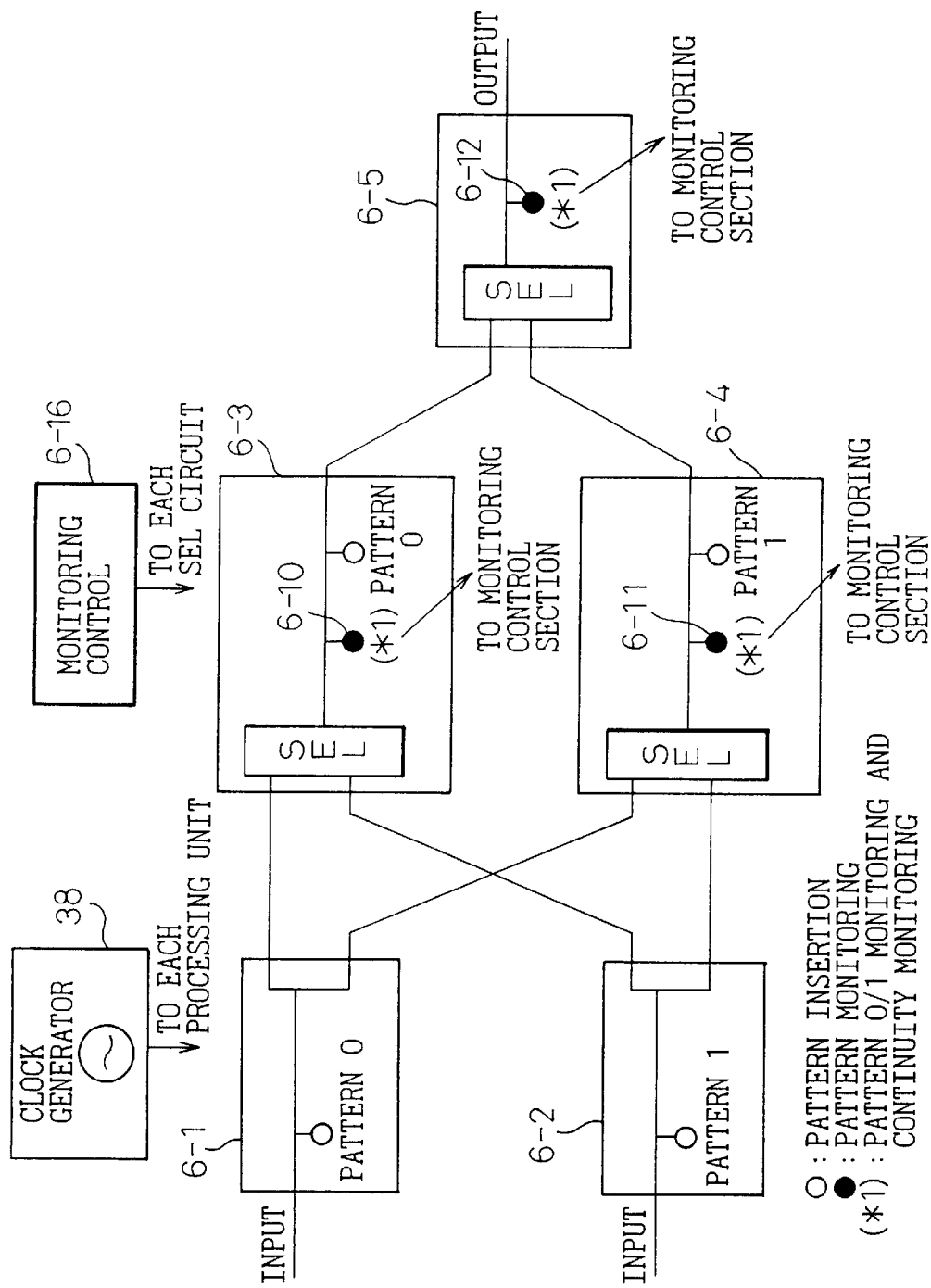
FIG. 12 is a block diagram showing the detailed configuration of the system of FIG. 5 that performs the automatic evaluation involving sequential switching.
Figure 13:
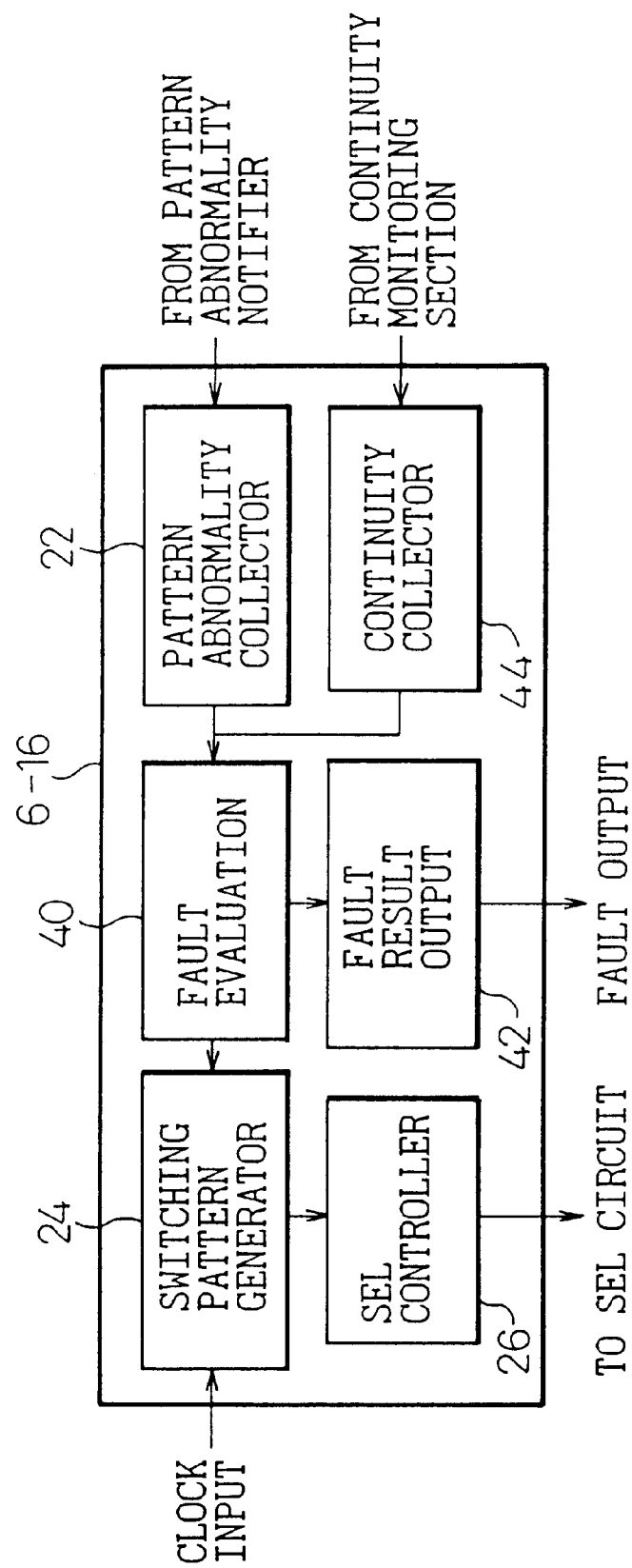
FIG. 13 is a block diagram showing the detailed configuration of the monitoring control section 6-16 in FIG. 12.

FIG. 12 shows the details of the system described with reference to FIG. 5 and that performs the automatic evaluation involving sequential switching illustrated in FIG. 7. The differences from FIG. 10 are that the pattern monitoring circuits 6-10, 6-11, and 6-12 are each provided with a main signal continuity monitoring function, and that a continuity collector 44 is added in the monitoring control section 6-16. After the unit assumed to be faulty has been switched out, the pattern monitoring circuit 6-10, 6-11, or 6-12 verifies whether the transmission channel continuity has been restored (steps 1104 or 1112 in FIG. 7), and reports the result to the continuity collector 44. The continuity collector 44 passes the information to the fault evaluation section 40. The remainder of the process is the same as that described with reference to FIG. 7.

What is claimed is:
1. A monitoring switching method for a redundant part of a transmission apparatus, comprising the steps of:
    in a plurality of first redundantly configured units, inserting respectively different first signal patterns in respectively different time slots for signals passing through the respective units;
    controlling a first selector to select all of said inserted first signal patterns in sequence, said first selector being configured to accept outputs from said plurality of first redundantly configured units and to select from among said outputs from said plurality of first redundantly configured units one main signal for output;

monitoring said first signal patterns at an output side of said first selector; and controlling said first selector based on the result of said monitoring.

2. A monitoring switching method according to claim 1, further comprising the steps of:

in a plurality of second redundantly configured units each having said selector, inserting respectively different second signal patterns in respectively different time slots for signals passing therethrough;

controlling a second selector to select all of said inserted second signal patterns in sequence, said second selector being configured to accept outputs from said plurality of second redundantly configured units and to select from among said outputs from said plurality of second redundantly configured units one main signal for output;

monitoring said second signal patterns at an output side of said second selector; and controlling said selector and said second selector based on the results of the monitoring of said signal patterns and said second signal patterns.

3. A monitoring switching apparatus for a redundant part of a transmission apparatus, comprising:

a plurality of first pattern inserting sections, respectively provided in a plurality of first redundantly configured units, for inserting respectively different first signal patterns in respectively different time slots for signals passing through the respective units;

a first selector for accepting outputs from said plurality of first redundantly configured units, and for selecting from among said outputs from said plurality of first redundantly configured units one main signal for output and also selecting all of said inserted first signal patterns in sequence;

a first pattern monitoring section, provided on an output side of said first selector, for monitoring said first signal patterns inserted by said first pattern inserting sections; and a monitoring control section for controlling said first selector based on the result of the monitoring performed by said first pattern monitoring section.

4. A monitoring switching apparatus according to claim 3, further comprising:

a plurality of second pattern inserting sections, respectively provided in a plurality of second redundantly configured units each having said selector, for inserting respectively different second signal patterns in respectively different time slots for signals passed through said pattern monitoring section;

a second selector for accepting outputs from said plurality of second redundantly configured units, and for selecting from among said outputs from said plurality of second redundantly configured units one main signal for output and also selecting all of said inserted second signal patterns in sequence; and a second pattern monitoring section, provided on an output side of said second selector, for monitoring said second signal patterns inserted by said second pattern inserting sections, and wherein said monitoring control section controls said selector and said second selector based on the results of the monitoring performed by said pattern monitoring section and said second pattern monitoring section.

* * * * *